(No Model.)

G. G. HUNT.
HARVESTER.

No. 310,944. Patented Jan. 20, 1885.

Witnesses:
Hiram Whitney
G. H. Steward

Inventor.
George G. Hunt

UNITED STATES PATENT OFFICE.

GEORGE G. HUNT, OF BRISTOL, ILLINOIS.

HARVESTER.

SPECIFICATION forming part of Letters Patent No. 310,944, dated January 20, 1885.

Application filed February 16, 1882. (No model.)

*To all whom it may concern:*

Be it known that I, GEORGE G. HUNT, of Bristol, Kendall county, Illinois, have invented a new and useful Improvement in Platform-Adjustments for Harvesters, the object of which is to obtain a more effectual means of holding and regulating the position of the master or bull wheel and the parts supported thereby in their proper position, of which the following is a specification.

Figure 1:
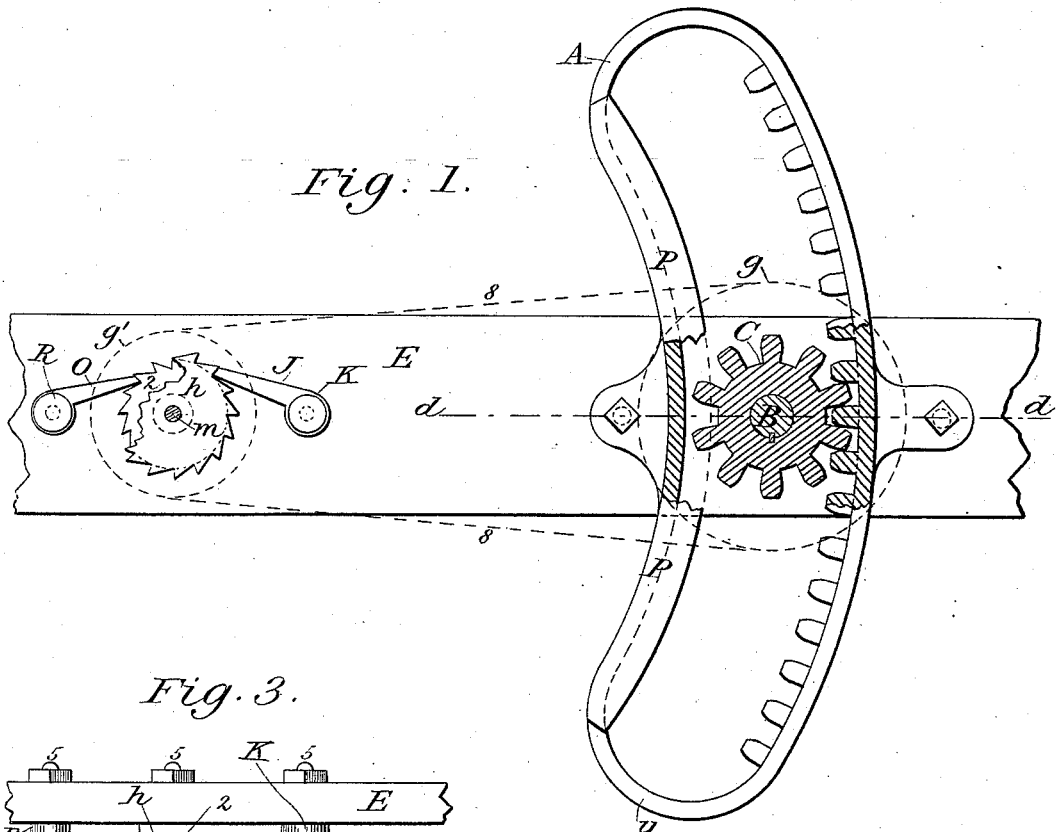

In the drawings accompanying and forming a part of this specification, and in which similar letters of reference in the several figures indicate like parts, Figure 1 represents a view of one of the side timbers, E, and attachments thereof, of a harvester.

Figure 3:
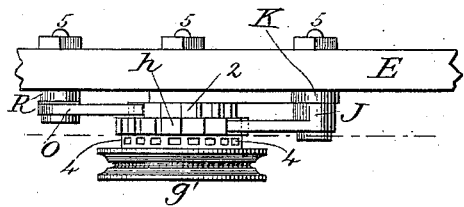
Figure 2:
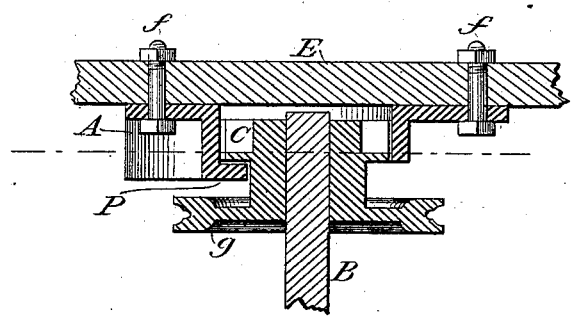

These timbers are placed one upon each side of the bull-wheel. To each of these timbers is bolted a segment-rack or side casting, A, the center of whose arcs is at $m$, (the center of the small shaft $g'$,) which is also in line with the center of the crank-shaft, the spur-pinion of which meshes with the main gear of the pole-wheel. The pole-wheel runs loosely upon the axle B, upon each end of which is fastened rigidly a pinion, C, which meshes into the teeth of the rack A. On one of the pinions is either cast or otherwise fixed a sheave, $g$, over which an endless chain passes in the line 8 to a smaller sheave, $g'$, to which is attached a double ratchet-wheel, $h^2$, which can rotate upon a fixed stud attached to a plate, K, Fig. 3. This plate also carries another stud upon which is hinged a pawl, J. Another pawl, O, is hinged upon a stud, R. These pawls abut against the teeth of the double ratchet-wheel and effectually prevent its moving in either direction only as occasion requires. Fig. 2 is a horizontal section on the line $d\,d$ of Fig. 1, and Fig. 3 is a top view of the double pawl - and - ratchet mechanism. The segmental racks A are provided with flanges or lips P, which hook over flanges on the pinion C. These flanges P project toward the shaft B far enough to just reach the outside of the hub of the pinions, against which they are designed to come in contact should the pinions incline to come "out of gear." The lips or flanges P form a guide by which the pinions C follow the arc of the racks, the lips and racks being concentric with each other.

$g$ is a sheave fast to one of the pinions, and which is rotated by the chain leading over the small sheave $g'$, which is turned by a lever inserted in one of a series of radial holes, 4 4. By lifting one or the other of the pawls the ratchet may be turned in either direction by the lever. As the sheaves and pinions are thus rotated, the teeth of the pinion follow the rack, and the frame can be raised or lowered, as desired.

It will be seen that the flanges P, (one upon each side of the bull-wheel,) which hook inside of the flanges of the pinions, effectually prevent any spreading apart of the side castings or racks, A. The pawl J, when resting against the teeth of the ratchet $h$, holds (through the sheaves and endless chain) the shaft B and pinions C from turning (the bull-wheel resting on the ground) from the weight of the frame, while the pawl O, through the before-mentioned medium, prevents the pinions and shaft from running down the rack out of the lower and open end. In doing this the frame would really be climbing away from the wheel. The lower part, $y$, of the segment forms a tie running across but out of the vertical plane in which the pinion moves, so that the pinions may be entered into their proper places from the bottom. The lever-holes may be in the teeth of the ratchet.

Having thus described my invention, what I claim as new, and desire to secure by Letters Patent, is—

The main frame and segment-rack plates, in combination with the main wheel, the axle provided with the pinions and chain-sheave, the endless chain, the actuating-sheave therefor, and the two oppositely - acting automatic pawls adapted to lock said actuating-sheave against rotation in either direction.

GEORGE G. HUNT.

Witnesses:
HIRAM WHITNEY,
G. H. STEWARD.